United States Patent [19]

Iida et al.

[11] Patent Number: 5,085,926
[45] Date of Patent: Feb. 4, 1992

[54] NEAT REFLECTING GLASS WITH MULTILAYER COATING

[75] Inventors: Yasunobu Iida, Matsusaka; Masato Nakamura, Mie Prefecture; Nobuyuki Takeuchi, Ise; Keiji Onishi, Matsusaka, all of Japan

[73] Assignee: Central Glass Company, Limited, Ube, Japan

[21] Appl. No.: 484,810

[22] Filed: Feb. 26, 1990

[30] Foreign Application Priority Data

Feb. 27, 1989 [JP] Japan .................................. 1-45644

[51] Int. Cl.$^5$ .............................................. B32B 17/06
[52] U.S. Cl. .................................... 428/216; 428/34; 428/215; 428/336; 428/426; 428/432; 428/433; 428/457; 428/469; 428/472; 428/698; 428/699; 428/701; 428/702; 428/704; 359/359; 359/360; 359/580; 359/589
[58] Field of Search ................ 350/1.6, 1.7, 166, 164; 428/334, 335, 336, 220, 412, 426, 432, 433, 457, 469, 472, 698, 699, 701, 702, 34, 704, 215, 216

[56] References Cited

U.S. PATENT DOCUMENTS

| | | | |
|---|---|---|---|
| 4,017,661 | 4/1972 | Gillery | 350/1.7 |
| 4,022,947 | 5/1977 | Grubb et al. | 350/1.7 |
| 4,450,201 | 5/1984 | Bull et al. | 428/336 |
| 4,534,841 | 8/1985 | Hartig et al. | 428/426 |
| 4,640,867 | 2/1987 | Oyama et al. | 428/472 |
| 4,769,291 | 9/1988 | Belkind et al. | 428/34 |
| 4,861,669 | 8/1989 | Gillerg | 428/432 |
| 4,900,630 | 2/1990 | Suzuki et al. | 428/432 |

FOREIGN PATENT DOCUMENTS

| | | |
|---|---|---|
| 0239280 | 9/1987 | European Pat. Off. . |
| 0283923 | 9/1988 | European Pat. Off. . |
| 61-55603 | 3/1986 | Japan . |
| 63-206333 | 8/1988 | Japan . |
| 63-242948 | 10/1988 | Japan . |
| 64-5930 | 1/1989 | Japan . |

*Primary Examiner*—Ellis P. Robinson
*Assistant Examiner*—Archene Turner
*Attorney, Agent, or Firm*—Fleit, Jacobson, Cohn, Price, Holman & Stern

[57] ABSTRACT

The invention provides a heat reflecting glass plate with a six-layer coating excellent in optical characteristics and also in durability on a transparent glass plate. The coating consists of (1) a metal oxide film deposited on the glass surface, (2) a metal nitride or oxynitride film deposited on the oxide film, (3) a metal film of Ti, Zr, Ta, Cr, Ni-Cr or stainless steel deposited on the nitride or oxynitride film to a thickness of 30–150 Å, (4) a metal nitride or oxynitride film overlying the metal film, (5) a metal oxide film overlying the film (4) and (6) a film of an oxide or oxynitride of Si-Al, Si-Ti or a film of aluminum nitride or oxynitride deposited on the film (5) to a thickness greater than 300 Å. The metal for the oxide films (1) and (5) is Ti, Zr, Ta, Sn or Cr, and the metal for the nitride or oxynitride films (2) and (4) is Ti, Zr, Ta, Cr, Ni-Cr or stainless steel. Each of the oxide films (1) and (5) is 200–1000 Å in thickness, and each of the nitride or oxynitride films (2) and (4) is 300–200 Å in thickness. The heat reflecting glass plate is not lower than 30% in transmittance for visible light, not higher than 60% in transmittance for solar radiation and not higher than 20% in reflectance for visible light.

10 Claims, 1 Drawing Sheet

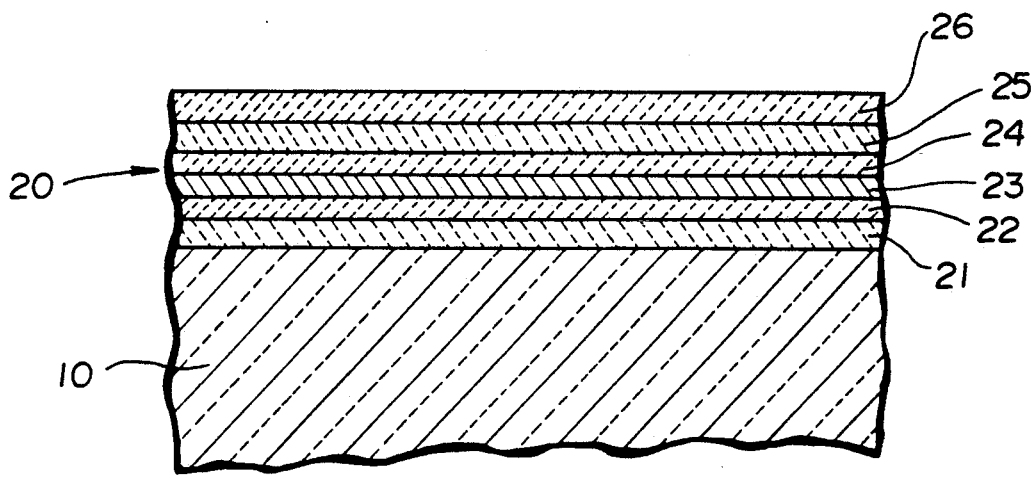

HEAT REFLECTING GLASS WITH MULTILAYER COATING

BACKGROUND OF THE INVENTION

This invention relates to a heat reflecting glass plate particularly suitable for use as a vehicle window glass, and more particularly to a glass plate having a heat reflecting multilayer coating which includes a layer of a heat reflective and corrosion resistant metal and several layers of light transmitting metal compound layers.

To produce a heat insulating glass low in transmittance for solar radiation it is well known to use a coating film of silver which is high in infrared reflectance. However, silver film is low in durability and wear resistance and also in transmittance for visible light. Therefore, when a heat reflecting glass using a silver film is required of relatively high transmittance for visible light as in the case of a vehicle window glass it is usual to form a multilayer coating by providing a transparent metal oxide film on each side of a silver film. However, even though such a measure is taken a heat reflective coating using silver film is practicable only in laminated glass since silver is poor in moisture resistance and weather resistance.

To provide a heat reflecting glass which is high in durability and is not necessarily used as laminated glass, recently there are various proposals of multilayer coatings using a heat reflective metal other than silver or a metal nitride. As a heat reflective coating of relatively simple structure, JP-A 61-55603 shows a two-layer coating consisting of a Ti, Cr, Co or Ni film coated on a glass surface and a TiN film covering the metal film, and JP-A 63-242948 shows a three-layer coating made up of a film of a metal such as Ti, Zr, Cr, Ni, Ta or stainless steel coated on a glass surface, a TiN or TaN film formed on the metal film and a metal oxide film as the outermost layer. However, heat reflecting glasses according to these publications are relatively high in reflectance for visible light incident on the uncoated side and are not fully satisfactory in the strength of adhesion of the coating or in wear resistance of the coating, and hence it is difficult to employ either of these proposals in a simple (not laminated) glass plate such as, for example, a window glass for an automobile door window or side window.

JP-A 63-206333 shows a heat reflecting glass with a multilayer coating which is, for example, made up of a $TiO_2$ film deposited on the glass surface, a TiN film on the oxide film, a $TiO_2$ film on the nitride film and a $SiO_2$ film as the outermost layer. JP-A 64-5930 shows a heat reflecing glass high in transmittance for visible light, which has a multilayer coating made up of, for example, a $SnO_2$ film on the glass surface, a $TiO_2$ film as the second layer, a TiN film as the third layer, a $TiO_2$ film as the fourth layer, and a $SnO_2$ layer as the fifth layer which may optionally be covered with a protective $SiO_2$ film. The coatings according to these proposals include no metal film. Therefore, to make either of these multilayer coatings comparable to a heat reflective coating using a metal film it is necessary to form relatively thick films of TiN and $TiO_2$ and this is unfavorable for productivity. Besides, the adhesion of the nitride film to the oxide films is not always sufficiently strong. As the outermost protective layer the $SiO_2$ film is excellent in durability and transparency. However, to form a $SiO_2$ film it is necessary to employ either a RF sputtering method which entails high cost of equipment or a sol-gel method which is relatively low in productivity and is liable to suffer from deposition of dust or degradation of quality by drying at high temperature.

SUMMARY OF THE INVENTION

It is an object of the present invention to provide a heat reflecting glass plate with a multilayer coating, which includes a film of a metal better than silver in stability and durability, is sufficiently high in both reflectance for solar radiation and transmittance for visible light and also in weather resistance, wear resistance, etc., and can be produced relatively easily and without problem.

The present invention provides a heat reflecting glass plate having a multilayer coating on one side of a transparent glass plate, the multilayer coating comprising a first layer which is a film of an oxide of a metal selected from Ti, Zr, Ta, Sn and Cr deposited on the glass surface and has a thickness in the range from 200 to 1000 Å, a second layer which is a film of a nitride or oxyniatride of a metal selected from Ti, Zr, Ta, Cr, Ni-Cr alloy and stainless steel deposited on the first layer and has a thickness in the range from 30 to 200 Å, a third layer which is a film of a metal selected from Ti, Zr, Ta, Cr, Ni-Cr alloy and stainless steel deposited on the second layer and has a thickness in the range from 30 to 150 Å, a fourth layer which is a film of a nitride or oxynitride of a metal selected from Ti, Zr, Ta, Cr, Ni-Cr alloy and stainless steel deposited on the third layer and has a thickness in the range from 30 to 200 Å, a fifth layer which is a film of an oxide of a metal selected from Ti, Zr, Ta, Sn and Cr deposited on the fourth layer and has a thickness in the range from 200 to 1000 Å, and a sixth layer which is a film of an oxide or oxynitride of an alloy selected from Si-Al alloy, Si-Ti alloy and Si-Ni alloy or a nitride or oxynitride of Al deposited on the fifth layer as the outermost layer and has a thickness greater than 300 Å. The multilayer coating is formed such that the heat reflecting glass plate is not lower than 30% in transmittance for visible light, not higher than 60% in transmittance for solar radiation and not higher than 20% in reflectance for visible light.

The six-layer coating according invention includes a heat reflective metal layer which is good in moisture resistance and corrosion resistance, and this metal layer is protected by the above defined metal compound layers. By virtue of the above specified combination and arrangement of the metal layer, metal oxide layers and metal nitride or oxynitride layers the multilayer coating is excellent in the tightness of adhesion to the glass surface and also adhesion of each layer to the adjacent layer(s). Further, the outermost sixth layer of a specific oxide, nitride or oxynitride is high in wear resistance and weather resistance and enhances the strength and durability of the whole coating.

With the six-layer coating according to the invention the transmittance of the heat reflecting glass plate for visible light can be made higher than 30% and can be desirably regulated over a relatively wide range by selecting the materials and thicknesses of the respective layers to suitably utilize the interference effects of the respective metal compound layers. This heat reflecting glass plate is sufficiently low in transmittance for solar radiation and, hence, high in heat insulating capability. Furthermore, this heat reflecting glass plate can be made fairly low in reflectance for visible light incident on either the coated side or the uncoated side.

A heat reflecting glass plate according to the invention is fully practicable as a simple (not laminated) plate and particularly suitable for use as an automobile window glass for a door window, side window or rear window. Also it is possible to use this glass plate as an automobile windshield, as a window glass for a different vehicle or as a window glass for buildings. As an automobile window glass, the glass plate of the invention affords good habitability to the car, and this window glass is favorable for safe driving because the glass hardly reflects images of inboard objects into the driver's field of view.

In this invention the transparent glass plate is either a colorless glass (so-called clear glass) plate or a colored glass plate. The glass is not necessarily an inorganic glass and may be a so-called organic or plastic glass such as polymethyl methacrylate. The glass plate may be either a flat plate or a curved plate and may be a reinforced or tempered glass plate.

BRIEF DESCRIPTION OF THE DRAWING

The single FIG. is a fragmentary and explanatorily enlarged sectional view of a glass plate having a heat-reflecting multilayer coating according to the invention.

DESCRIPTION OF THE PREFERRED EMBODIMENTS

FIG. 1 shows the construction of a heat-reflecting multilayer coating 20 according to the invention. The multilayer coating 20 is made up of a first layer 21 which is a metal oxide film deposited directly on one surface of a glass plate 10, a second layer 22 which is a metal nitride or oxynitride film laid on the first layer 21, a third layer 23 which is a metal film laid on the second layer 22, a fourth layer 24 which is a metal nitride or oxynitride film laid on the third layer 23, a fifth layer 25 which is a metal oxide film laid on the fourth layer 24 and a sixth layer 26 which is a film of an oxide or oxynitride of a silicon alloy, or a film of aluminum nitride or oxynitride, coated on the fifth layer 25 as the outermost layer of the coating 20.

More specifically, the first layer 21 of the multilayer coating 20 is a film of an oxide of a metal selected from Ti, Zr, Ta, Sn and Cr, viz., a film of $TiO_x$ (where $0 < x \leq 2$), $ZrO_x$ (where $0 < x \leq 2$), $SnO_x$ (where $0 < x \leq 2$), $TaO_x$ (where $0 < x \leq 5/2$) or $CrO_x$ (where $0 < x \leq 3/2$). As the base layer of the multilayer coating 20 this metal oxide film 21 affords the coating strong adhesion to the glass plate 10 and, besides, serves as an element for controlling the transmittance and reflectance of the multilayer coating 20 for visible light by interference between the respective layers of the coating. To serve these purposes the first layer 21 has a thickness ranging from 200 to 1000 Å, and preferably within the range from 250 to 800 Å.

The second layer 22 of the coating 20 is a film of a nitride or oxynitride of a metal selected from Ti, Zr, Ta, Cr, Ni-Cr alloy and stainless steel (abbreviated to SUS), viz., a film of $TiN_xO_y$ (where $0 < x \leq 1$, $0 \leq y \leq 2$), $ZrN_xO_y$ (where $0 < x \leq 1$, $0 \leq y \leq 2$), $TaN_xO_y$ (where $0 \leq x \leq 1$, $0 \leq y \leq 5/2$), $CrN_xO_y$ (where $0 < x \leq 1$, $0 \leq y \leq 3/2$), $Ni\ CrN_xO_y$ (where $0 < x \leq 1$, $0 \leq y \leq 1$) or $SUSN_xO_y$ (where $0 < x \leq 1$, $0 \leq y \leq 1$). The nitride or oxynitride film 22 is formed by reactive sputtering in a mixed gas of nitrogen and oxygen ($N_2:O_2$ ratio is from 100:0 to 50:50 by volume). It is rather better to form an oxynitride relatively high in the content of nitrogen and relatively low in the content of oxygen. The proportion of nitrogen to oxygen in the oxynitride film may be gradient in the thickness direction. The primary role of the second layer 22 is strongly bonding the overlying metal film 23 to the metal oxide film 21. Besides, at and after the stage of forming the metal film 23 the existence of the nitride or oxynitride film 22 is effective for preventing changes in the heat reflecting capability or the color tone of the metal film 23. Further, this film 22 protects the metal film 23 from corrosion. To serve these purposes the nitride or oxynitride film 22 has a thickness ranging from 30 to 200 Å, and preferably within the range from 40 to 150 Å. It is best that the thickness is from 40 to 100 Å.

The third layer 23 is a film of a metal selected from Ti, Zr, Ta, Cr, Ni-Cr alloy and stainless steel. Compared with noble metals such as Ag and Au which have been used as reflective materials in laminated glass, the metals employed in this invention are superior in moisture resistance, wear resistance and corrosion resistance. In the form of a film any of these metals possesses heat reflecting ability and is better than metal oxide films or metal nitride films in heat reflecting efficiency. The thickness of the metal film 23 is limited within the range from 30 to 150 Å. Outside this range it is difficult to realize the desired values of the transmittance of the multilayer coating 20 for visible light and solar radiation and/or the reflectance of the same coating for visible light even though the other layers 21, 22, 24, 25, 26 are formed in accordance with the invention. Preferably the thickness of the metal film 23 ranges from 40 to 130 Å.

The fourth layer 24 is a film of a nitride or oxynitride of a metal selected from Ti, Zr, Ta, Cr, Ni-Cr alloy and stainless steel and has a thickness in the range from 30 to 200 Å. That is, the fourth layer 24 is similar to the second layer 22, though the metal nitride or oxynitride of the fourth layer 24 in each coating 20 is not necessarily the same as the material of the second layer 22 of that coating. The fourth layer 24 strongly bonds the overlying oxide film 25 to the metal film 23 and, besides, serves the same purposes as the second layer 22. It is desirable that the thickness of the fourth layer 24 is in the range from 40 to 150 Å, and preferably in the range from 40 to 100 Å.

The fifth layer 25 is a film of an oxide of a metal selected from Ti, Zr, Ta, Sn and Cr and has a thickness in the range from 200 to 1000 Å. That is, the fifth layer 25 is similar to the first layer 21, though the metal oxide of the fifth layer 25 in each coating 20 is not necessarily the same as the material of the first layer 21 of that coating 20. The fifth layer 25 is a protective layer and, furthermore, is incorporated to adjust the transmittance and reflectance of the multilater coating 20. Preferably the thickness of the fifth layer 25 is in the range from 250 to 800 Å.

As the surface layer of the multilayer coating 20 the sixth layer 26 is a film of an oxide or oxynitride of a silicon alloy selected from Si-Al, Si-Ti and Si-Ni alloys or a film of aluminum nitride or oxynitride. That is, the sixth layer 26 is a film of $Si.AlN_xO_y$ (where $0 \leq x < 7/3$, $0 < y \leq 7/2$), $Si.TiN_xO_y$ (where $0 \leq x < 7/3$, $0 < y \leq 4$), $Si.NiN_xO_y$ (where $0 \leq x < 1$, $0 < y \leq 3$) or $AlN_xO_y$ (where $0 < x \leq 1$, $0 \leq y \leq 7/2$). The film as the sixth layer 26 is formed by reactive sputtering in a mixed gas of nitrogen and oxygen. In the mixed gas the proportion of $N_2$ to $O_2$ is from 0:100 to 50:50 in the case of depositing Si.$AlN_xO_y$, $Si.TiN_xO_y$ or $Si.NiN_xO_y$ and from 100:0 to 50:50 in the case of depositing $AlN_xO_y$. It is rather preferred to employ an oxynitride film as the sixth layer 26. The thickness of the sixth layer 26 is greater than 300 Å, and preferably in the range from 400 to 2000 Å. If it is intended to deposit a film thicker than 2000 Å as the sixth layer the deposited film is liable to suffer from defects such as cracks. Every film employed as the sixth layer 26 is a hard film high in wear resistance and strogly adheres to the underlying oxide layer 25. The film 26 can be formed relatively easily by a DC sputtering method. This layer 26 affords a hard and wear resistant surface to the multilayer coating 20 and, further, enhances the strength, weatherabily and chemical resistance of the coating 20 as a whole and prevents peeling of any layer of the coating 20.

The multilayer coating 20 is constructed such that the coated glass plate becomes not lower than 30% in transmittance for visible light and not higher than 60% in transmittance for solar radiation. If the transmittance for visible light is below 30% the coated glass plate is unsuitable for use as a vehicle window glass, and particularly as an automobile rear window glass, because the visibility through the window glass is insufficient for safe driving of the vehicle. It is preferable that the transmittance for visible light is not lower than 35%. The transmittance for solar radiation is limited to 60% at the highest with a view to improving the efficiency of air-conditioning of the building or vehicle to which the heat-reflecting glass plate is applied and improving the habitability of the vehicle interior. Furthermore, the coating 20 is constructed such that the coated glass plate becomes not higher than 20% in reflectance for visible light. If the reflectance exceeds 20% the heat reflecting glass plate is unsuitable for use, for example, as an automobile window glass because by a mirror effect images of inboard objects intrude into the driver's field of view as an obstacle to safe driving and also because the window glass offers undesirable glare to the drivers of oncoming cars. It is desirable that the reflectance for visible light is not higher than 15% and preferably not higher than 10%.

The invention is further illustrated by the following nonlimitative examples.

EXAMPLE 1

A six-layer coating (20) shown in the Figure was formed on a 600 mm square and 3.0 mm thick plate (10) of a transparent and colorless glass (FL3). The glass plate exhibited a transmittance of about 89.5% for visible light.

The glass plate was washed with a neutral detergent, rinsed with water and further with isopropyl alcohol and dried. Then the glass plate was set horizontally on a carrier which was horizontally movably installed in a vacuum chamber of a DC magnetron reactive sputtering apparatus. The carrier was reciprocatively movable so as to be positioned alternately above a target of Ta, a target of stainless steel, SUS 316 (austenitic, containing 10.00–14.00 wt % of Ni, 16.00–18.00 wt % of Cr and 2.00–3.00 wt % of Mo), and a target of Al-Si alloy (50:50 by weight). The chamber was depressurized to the extent of about $5 \times 10^{-6}$ Torr, and then oxygen gas was introduced into the vacuum chamber to maintain the degree of vacuum at about $2.5 \times 10^{-3}$ Torr. Under such condition the Ta target was sputtered at a power of about 2.5 kW while the glass plate was horizontally moved in a region above the Ta target at a constant speed of about 20 mm/min. As the result a $Ta_2O_5$ film having a thickness of about 500 Å deposited on the glass plate as the first layer 21 in the Figure.

Then the feed of oxygen gas was stopped, and the vacuum chamber was depressurized to the extent of about $5 \times 10^{-6}$ Torr while the glass plate was kept in the chamber, and then a mixed gas of $N_2$ and $O_2$ (50:50 by volume) was introduced to maintain the degree of vacuum at about $2.5 \times 10^{-3}$ Torr. Then the Ta target was sputtered at a power of about 2.5 kW while the glass plate above the target was horizontally moved at a constant speed of about 450 mm/min. As the result, a tantalum oxynitride film having a thickness of about 50 Å deposited, as the second layer 22, on the $TaO_5$ film 21.

The feed of the $N_2$—$O_2$ mixed gas was stopped, and the vacuum chamber was depressurized to the extent of about $5 \times 10^{-6}$ Torr while the glass plate was kept in the chamber, and then argon gas was introduced to maintain the degree of vacuum at about $3 \times 10^{-3}$ Torr. The glass plate was carried to a region above the stainless steel target, and this target was sputtered at a power of about 1.0 kW while the glass plate was horizontally moved at a constant speed of about 1500 mm/min. As the result a stainless steel (SUS 316) film having a thickness of about 40 Å deposited, as the third layer 23, on the $TaN_xO_y$ film 22.

The feed of argon gas was stopped, and the vacuum chamber was depressurized to the extent of about $5 \times 10^{-6}$ Torr, and then the $N_2$—$O_2$ mixed gas (50:50) was again introduced to maintain the degree of vacuum at about $2.5 \times 10^{-3}$ Torr while the glass plate was carried to the region above the Ta target. Then the Ta target was sputtered at a power of about 2.5 kW while the glass plate was horizontally moved at a constant speed of about 450 mm/min. As the result a tatalum oxynitride film having a thickness of about 50 Å deposited, as the fourth layer 24, on the stainless stee film 23.

Next, oxygen gas was introduced in place of the $N_2$—$O_2$ mixed gas, and the above described sputtering operation to form the $Ta_2O_5$ film 21 was repeated except that the speed of the horizontal movement of the glass plate was increased to about 25 mm/min. As the result a $Ta_2O_5$ film having a thickness of about 50 Å deposited, as the fifth layer 25, on the $TaN_xO_y$ film 24.

After that the vacuum chamber was depressurized to the extent of about $5 \times 10^{-6}$ Torr, and the $N_2$—$O_2$ mixed gas (50:50) was introduced to maintain the degree of vacuum at about $2.5 \times 10^{-3}$ Torr. The glass plate was carried to a region above the Al-Si target, and this target was sputtered at a power of about 2.5 kW while the glass plate was horizontally moved at a constant speed of about 20 mm/min. As the result a film of Al-Si oxynitride ($Al.SiN_xO_y$) having a thickness of about 500 Å deposited, as the sixth (outermost) layer 26, on the $Ta_2O_5$ film 25.

By the above process a six-layer coating (20) was formed on one side of the glass plate 10. Several samples were produced by the same process and under the same conditions.

On the samples of the coated glass plate the transmittance and reflectance for visible light (380–780 nm) and transmittance of solar radiation (340–1800 nm) were measured with an automatic recording spectrophotometer (Type 340 of Hitachi Seisakusho Co.) by the methods according to JIS Z 8722 and JIS R 3106. The results are shown in the following Table 2.

Besides, wear resistance of the multilayer coating was examined by the Taber test and also by a sand eraser test. The Taber test was made on 10 cm square testpieces of the coated glass plate with a Taber's abrasion tester (MODEL 503 of TYBER Co.) using two abrading wheels of CS-10F type. A load of 500 g was applied to each abrading wheel, and the test was continued until 1000 turns of the abrading wheels on the surface of the multilayer coating (20). Before and after testing the transmittance of each test piece for visible light was measured to represent the wear resistance by the amount of the difference between the two measurements of the transmittance. The sand eraser test was made by rubbing a commercial sand eraser (stationary) against the surface of the multilayer coating for about 10 sec, and the degree of damage of the coating was examined by visual observation. The results are shown in Table 2. As to the result of the sand eraser test, "OK" means only slight flawing of the coating surface and "NG" means serious flawing of the coating surface or considerable abrasion of the coating.

Further, acid and alkali resistances of the multilayer coating were examined by immersing some specimens (10 cm square) of the coated glass plate in 0.15N HCl solution at about 60° C. for about 48 hr and separate specimens in 0.125N NaOH solution at about 60° C. for about 48 hr. In both cases the degree of deterioration of the coating was examined by visual observation. The results are shown in Table 2, wherein "OK" means hardly perceptible deterioration and "NG" means significant deterioration.

Judging from the data in Table 2, the heat reflecting glass plate of Example 1 is excellent in heat insulating capability and also in wear resistance and chemical resistance and suitable for practical use in buildings or vehicles.

EXAMPLE 2

By fundamentally by the same reactive sputtering method as in Example 1 using the same apparatus, a six-layer coating was formed on the glass plate used in Example 1 in the following way.

As the first layer 21, a $SnO_2$ film having a thickness of about 500 Å was deposited on the glass plate by sputtering a Sn target at a power of about 1.0 kW in oxygen gas atmosphere at a pressure of about $2.5 \times 10^{-3}$ Torr, while horizontally moving the glass plate at a constant speed of about 40 mm/min. As the second layer 22, a titanium oxynitride film having a thickness of about 50 Å was deposited by sputtering a Ti target at a power of about 2.5 kW in a $N_2$—$O_2$ mixed gas (50:50 by volume) atmosphere at a pressure of about $2.5 \times 10^{-3}$ Torr, while horizontally moving the glass plate at a constant speed of about 400 mm/min. As the third layer 23, a Ti film having a thickness of about 50 Å was deposited by sputtering the Ti target at a power of about 1.5 kW in argon gas atmosphere at a pressure of about $3 \times 10^{-3}$ Torr, while horizontally moving the glass plate at a constant speed of about 800 mm/min. As the fourth layer 24, a titanium oxynitride film having a thickness of about 50 Å was deposited under the same conditions as in depositing the second layer 22. As the fifth layer 25, a $SnO_2$ film having a thickness of about 600 Å was deposited under the same conditions as in depositing the first layer 21 except that the speed of the movement of the glass plate was reduced to about 33 mm/min. As the sixth (outermost) layer 26, a film of Ni-Si oxynitride (Ni.SiN$_x$O$_y$) having a thickness of about 500 Å was deposited by sputtering a Ni-Si alloy (50:50 by weight) target at a power of about 2.5 kW in the aforementioned $N_2$—$O_2$ mixed gas atmosphere at a pressure of about $2.5 \times 10^{-3}$ Torr, while horizontally moving the glass plate at a constant speed of about 30 mm/min.

The characteristics of the obtained multilayer coating were as shown in Table 2. This coating too was judged to be excellent and fully practicable as a heat reflecting glass for buildings and vehicles.

EXAMPLES 3-11

As shown in Table 1, in these examples the multilayer coating of Example 1 or 2 was modified in the material of at least one of the six layers and/or the thicknesses of some layers. In every example the multilayer coating was formed by the sequential sputtering method employed in Example 1 except that the target materials and the gases were selectively changed according to the aimed films and that in some cases the sputtering conditions were slightly varied. The particulars were as follows.

To deposit a $TiO_2$ film as either the first layer 21 or the fifth layer 25, Ti was used as the target material, and sputtering was performed at a power of about 2.5 kW in oxygen gas at a pressure of about $2.5 \times 10^{-3}$ Torr. To deposit a film of stainless steel oxynitride (SUSN$_x$O$_y$) as either the second layer 22 or the fourth layer 24, stainless steel SUS 316 was used as the target material, and sputtering was performed at about 2.5 kW in $N_2$—$O_2$ mixed gas (50:50 by volume) at a pressure of about $2.5 \times 10^{-3}$ Torr. To deposit a film of a Ti-Si oxynitride (Ti.SiN$_x$O$_y$) as the sixth layer 26, a Ti-Si alloy (50:50 by weight) was used as the target material, and sputtering was performed at about 3.0 kW in $N_2$—$O_2$ mixed gas (50:50 by volume) at about $2.5 \times 10^{-3}$ Torr. To deposit a Ta film as the third layer 23, Ta was used as the target material, and sputtering was performed at about 1.5 kW in argon gas at about $3.0 \times 10^{-3}$ Torr. To deposit a Ni-Cr film as the third layer 23, a Ni-Cr alloy (20:80 by weight) was used as the target material, and sputtering was performed at about 1.5 kW in argon gas at about $3.0 \times 10^{-3}$ Torr. To vary the thickness of the deposited film of a given material, the speed of horizontal movement of the glass plate 10 was varied approximately inversely proportionally.

The characteristics of the heat reflecting glass plates produced in these examples were examined by the methods described in Example 1. The results were satisfactory as shown in Table 2.

COMPARATIVE EXAMPLES 1-4

As shown in Table 1, the multilayer coatings of Examples 1, 4, 5 and 8 were respectively modified such that the lamination structure became not in accordance with the invention. In Comparative Examples 1 and 2 the second, fourth and sixth layers 22, 24 and 26 were omitted to form a three-layer coating in which a metal layer was laid on a metal oxide layer and overlaid with a metal oxide layer. In Comparative Examples 3 and 4 the sixth layer 26 was omitted to form a five-layer coating with a metal oxide layer as the outermost layer. Besides, minor changes were made in the material and/or thickness of one or more layer(s) in each coating, and in particular in Comparative Example 4 the metal film 24 was made considerably thicker than 150 Å.

The characteristics of the heat reflecting glass plates produced in Comparative Examples 1-4 were examined by the methods described in Example 1. The results were as shown in Table 2.

TABLE 1

| | Structure of Multilayer Coating (thickness, Å) | | | | | |
|---|---|---|---|---|---|---|
| | 1st layer | 2nd layer | 3rd layer | 4th layer | 5th layer | 6th layer |
| Example 1 | $Ta_2O_5(500)$ | $TaN_xO_y(50)$ | SUS(40) | $TaN_xO_y(50)$ | $Ta_2O_5(400)$ | $Al.SiN_xO_y(500)$ |
| Example 2 | $SnO_2(500)$ | $TiN_xO_y(50)$ | Ti(50) | $TiN_xO_y(50)$ | $SnO_2(600)$ | $Ni.SiN_xO_y(500)$ |
| Example 3 | $TiO_2(300)$ | $SUSN_xO_y(50)$ | SUS(40) | $SUSN_xO_y(50)$ | $TiO_2(400)$ | $Ti.SiN_xO_y(700)$ |
| Example 4 | $Ta_2O_5(500)$ | $TaN_xO_y(40)$ | SUS(150) | $TaN_xO_y(40)$ | $Ta_2O_5(700)$ | $Al.SiN_xO_y(500)$ |
| Example 5 | $SnO_2(300)$ | $SUSN_xO_y(50)$ | SUS(80) | $SUSN_xO_y(50)$ | $Ta_2O_5(300)$ | $Ni.SiN_xO_y(600)$ |
| Example 6 | $Ta_2O_5(500)$ | $TaN_xO_y(30)$ | Ta(30) | $TaN_xO_y(30)$ | $Ta_2O_5(400)$ | $Ni.SiN_xO_y(1000)$ |
| Example 7 | $TiO_2(400)$ | $TiN_xO_y(50)$ | Ti(100) | $TiN_xO_y(50)$ | $TiO_2(400)$ | $Ti.SiN_xO_y(600)$ |
| Example 8 | $Ta_2O_5(400)$ | $TiN_xO_y(30)$ | Ni—Cr(70) | $TiN_xO_y(30)$ | $Ta_2O_5(700)$ | $Al.SiN_xO_y(800)$ |
| Example 9 | $TiO_2(300)$ | $TiN_xO_y(180)$ | SUS(40) | $TiN_xO_y(180)$ | $TiO_2(400)$ | $Al.SiN_xO_y(500)$ |
| Example 10 | $Ta_2O_5(300)$ | $TaN_xO_y(150)$ | Ti(150) | $TaN_xO_y(150)$ | $Ta_2O_5(500)$ | $Ni.SiN_xO_y(700)$ |
| Example 11 | $Ta_2O_5(400)$ | $TaN_xO_y(100)$ | Ta(70) | $TaN_xO_y(100)$ | $Ta_2O_5(700)$ | $Ti.SiN_xO_y(500)$ |
| Comp. Ex. 1 | $Ta_2O_5(400)$ | — | Ni—Cr(80) | — | $SnO_2(400)$ | — |
| Comp. Ex. 2 | $SnO_5(500)$ | — | SUS(50) | — | $Ta_2O_5(600)$ | — |
| Comp. Ex. 3 | $Ta_2O_5(500)$ | $TaN_xO_y(30)$ | SUS(40) | $TaN_xO_y(50)$ | $SnO_2(500)$ | — |
| Comp. Ex. 4 | $Ta_2O_5(500)$ | $TaN_xO_y(30)$ | SUS(180) | $TaN_xO_y(50)$ | $Ta_2O_5(500)$ | — |

TABLE 2

| | Visible Light Transmittance (%) | Solar Radiation Transmittance (%) | Visible Light Reflectance (%) | | Wear Resistance | | | |
|---|---|---|---|---|---|---|---|---|
| | | | uncoated side | coated side | Taber Test (change in transmittance, %) | Sand Eraser Test | Acid Resistance | Alkali Resistance |
| Example 1 | 72.5 | 57.5 | 8.5 | 8.0 | 4.5 | OK | OK | OK |
| Example 2 | 71.5 | 58.0 | 9.3 | 8.7 | 4.6 | OK | OK | OK |
| Example 3 | 70.7 | 58.4 | 9.5 | 9.3 | 4.2 | OK | OK | OK |
| Example 4 | 31.5 | 24.9 | 16.7 | 19.3 | 2.9 | OK | OK | OK |
| Example 5 | 52.5 | 46.8 | 13.7 | 12.0 | 3.5 | OK | OK | OK |
| Example 6 | 72.2 | 59.6 | 9.3 | 8.6 | 1.9 | OK | OK | OK |
| Example 7 | 46.5 | 40.5 | 15.8 | 12.4 | 4.0 | OK | OK | OK |
| Example 8 | 62.4 | 56.3 | 12.0 | 12.6 | 4.2 | OK | OK | OK |
| Example 9 | 72.5 | 58.6 | 8.8 | 8.5 | 4.3 | OK | OK | OK |
| Example 10 | 30.2 | 25.8 | 17.3 | 18.6 | 2.5 | OK | OK | OK |
| Example 11 | 58.6 | 53.5 | 12.8 | 13.2 | 3.6 | OK | OK | OK |
| Comp. Ex. 1 | 60.3 | 55.2 | 13.0 | 13.3 | 20.5 | NG | NG | NG |
| Comp. Ex. 2 | 70.7 | 59.3 | 8.6 | 9.2 | 10.4 | NG | NG | NG |
| Comp. Ex. 3 | 70.6 | 57.2 | 11.0 | 10.0 | 8.5 | NG | NG | OK |
| Comp. Ex. 4 | 26.5 | 23.2 | 20.6 | 19.8 | 6.0 | NG | NG | OK |

What is claimed is:

1. A heat reflecting glass plate, comprising a transparent glass plate and a multilayer coating formed on one side of the glass plate, the multilayer coating comprising:

a first layer which is a film of an oxide of a metal selected from the group consisting of Ti, Zr, Ta, Sn and Cr deposited on the glass surface and has a thickness in the range from 250 to 800 Å;

a second layer which is a film of an oxynitride of a metal selected from the group consisting of Ti, Zr, Ta, Cr, Ni-Cr alloy and stainless steel deposited on said first layer and has a thickness in the range from 30 to 200 Å;

a third layer which is a film of a metal selected from the group consisting of Ti, Zr, Ta, Cr, Ni-Cr alloy and stainless steel deposited on said second layer and has a thickness in the range from 30 to 150 Å;

a fourth layer which is a film of an oxynitride of a metal selected from the group consisting of Ti, Zr, Ta, Cr, Ni-Cr alloy and stainless steel deposited on said third layer and has a thickness in the range from 30 to 200 Å;

a fifth layer which is a film of an oxide of a metal selected from the group consisting of Ti, Zr, Ta, Sn and Cr deposited on said fourth layer and has a thickness in the range from 250 to 800 Å; and a sixth layer which is a film of an oxynitride of an alloy selected from the group consisting of Si-Ti alloy and Si-Ni alloy deposited on said fifth layer as the outermost layer and has a thickness in the range from 400 to 2000 Å;

the multilayer coasting being formed such that the heat reflecting glass plate is not lower than 30% in transmittance for visible light, not higher than 60% in transmittance for solar radiation and not higher than 20% in reflectance for visible light.

2. A heat reflecting glass plate according to claim 1, wherein the thickness of each of said second and fourth layers is in the range from 40 to 150 Å.

3. A heat reflecting glass plate according to claim 1, wherein the thickness of said third layer is in the range from 40 to 130 Å.

4. A heat reflecting glass plate according to claim 1, wherein each of said second and fourth layers is a film deposited by reactive sputtering in a mixed gas of $N_2$ and $O_2$, the proportion of $N_2$ to $O_2$ in said mixed gas being in the range from 100:0 to 50:50 by volume.

5. A heat reflecting glass plate according to claim 1, wherein said sixth layer is an alloy oxide oxynitride film deposited by reactive sputtering in a mixed gas of $N_2$ and $O_2$, the proportion of $N_2$ to $O_2$ in said mixed gas being in the range from 0:100 to 50:50 by volume.

6. A heat reflecting glass plate according to claim 1, wherein said first and fifth layers are similar to each other in chemical composition.

7. A heat reflecting glass plate according to claim 1, wherein said second and fourth layers are similar to each other in chemical composition.

8. A heat reflecting glass plate according to claim 1, wherein said glass plate is an inorganic glass plate.

9. A heat reflecting glass plate according to claim 1, wherein said glass plate is an organic glass plate.

10. A heat reflecting glass plate according to claim 1, wherein said glass plate is an automobile window glass.

* * * * *

UNITED STATES PATENT AND TRADEMARK OFFICE
CERTIFICATE OF CORRECTION

PATENT NO. : 5,085,926
DATED : February 4, 1992
INVENTOR(S) : Yasunobu IIDA et al It is certified that error appears in the above-identified patent and that said Letters Patent is hereby corrected as shown below:

In the Title Page, item [54] delete "NEAT REFLECTING GLASS WITH MULTILAYER COATING" insert --HEAT REFLECTING GLASS WITH MULTILAYER COATING--.

Signed and Sealed this

Eighteenth Day of May, 1993

Attest:

MICHAEL K. KIRK

Attesting Officer    Acting Commissioner of Patents and Trademarks